(12) United States Patent
Rapaport et al.

(10) Patent No.: US 7,075,707 B1
(45) Date of Patent: Jul. 11, 2006

(54) SUBSTRATE DESIGN FOR OPTIMIZED PERFORMANCE OF UP-CONVERSION PHOSPHORS UTILIZING PROPER THERMAL MANAGEMENT

(75) Inventors: Alexandra Rapaport, Orlando, FL (US); Anne Janet Milliez, Orlando, FL (US); Michael Bass, Orlando, FL (US); Hans Jenssen, Palm Harbor, FL (US)

(73) Assignee: Research Foundation of the University of Central Florida, Incorporated, Orlando, FL (US)

( * ) Notice: Subject to any disclaimer, the term of this patent is extended or adjusted under 35 U.S.C. 154(b) by 183 days.

(21) Appl. No.: 10/841,188

(22) Filed: May 7, 2004

Related U.S. Application Data

(63) Continuation-in-part of application No. 09/919,130, filed on Jul. 31, 2001, now Pat. No. 6,844,387, and a continuation-in-part of application No. 09/919,131, filed on Jul. 31, 2001, now Pat. No. 6,654,161, which is a continuation-in-part of application No. 09/448,657, filed on Nov. 24, 1999, now Pat. No. 6,327,074.

(60) Provisional application No. 60/109,837, filed on Nov. 25, 1998.

(51) Int. Cl.
*G02F 1/355* (2006.01)
*G11C 13/04* (2006.01)

(52) U.S. Cl. .................................. 359/326; 365/151

(58) Field of Classification Search ................ 524/403, 524/413, 130, 132; 359/326; 365/151
See application file for complete search history.

(56) References Cited

U.S. PATENT DOCUMENTS

| | | | | |
|---|---|---|---|---|
| 4,448,547 A | * | 5/1984 | Wickersheim | 374/131 |
| 4,978,888 A | * | 12/1990 | Anandan et al. | 315/58 |
| 5,245,623 A | * | 9/1993 | McFarlane | 372/69 |
| 5,583,393 A | * | 12/1996 | Jones | 313/495 |
| 5,801,792 A | * | 9/1998 | Smith et al. | 348/749 |
| 6,327,074 B1 | * | 12/2001 | Bass et al. | 359/326 |
| 6,654,161 B1 | * | 11/2003 | Bass et al. | 359/326 |
| 6,844,387 B1 | * | 1/2005 | Bass et al. | 524/403 |
| 2004/0129946 A1 | * | 7/2004 | Nagai et al. | 257/98 |

* cited by examiner

*Primary Examiner*—John D. Lee
(74) *Attorney, Agent, or Firm*—Brian S. Steinberger; Law Offices of Brian S. Steinberger, P.A.

(57) ABSTRACT

Methods and compositions for using an up-conversion phosphor as an emitting material in a reflective displays and Polymer compositions for display mediums, and blue green red (BRG) display mediums. Roles of the pumping duration and character on the temperature and the efficiency of the up-conversion process in (Ytterbium, Erbium or Thulium) co-doped fluoride crystals are set forth. Methods, compositions and display mediums for using up-conversion phosphors in both reflective and transmissive displays in which the substrate and pixel shapes are designed to maximally remove heat deposited in the emitting material and thereby improve the efficiency of up conversion.

17 Claims, 2 Drawing Sheets

SUBSTRATE DESIGN FOR OPTIMIZED PERFORMANCE OF UP-CONVERSION PHOSPHORS UTILIZING PROPER THERMAL MANAGEMENT

This invention is a Continuation-In-Part of U.S. applications Ser. No. 09/919,130 filed Jul. 31, 2001, now issued as U.S. Pat. No. 6,844,387 and Ser. No. 09/919,131 filed Jul. 31, 2001, now issued as U.S. Pat. No. 6,654,161, which are Continuation-In-Part applications of U.S. application Ser. No. 09/448,657 filed Nov. 24, 1999, now U.S. Pat. No. 6,327,074, which claims the benefit of priority to U.S. Provisional Application 60/109,837 filed Nov. 25, 1998.

This invention was funded in part under U.S. Army Contract DAAD199910220.

FIELD OF INVENTION

This invention relates to the up-conversion efficiency of donor-acceptor doubly doped crystals dispersed in a stabilized polymer or other passive hosts and in particular to a class of fluoride crystals co-doped with ytterbium and erbium or thulium to provide composites and methods for use in luminescent displays.

BACKGROUND AND PRIOR ART

Displays using liquid crystals have been proposed for generating color displays (see for example, U.S. Pat. Nos. 5,359,345 and 5,724,062 to Hunter). However, these patents require arranging individual pixels in rows and corresponding columns, (column 4, lines 36–39). The devices described can be expensive and complicated to manufacture, and can have narrow angular view ranges with low brightness. Additional display systems have been proposed with similar problems to those described above (see for example, U.S. Pat. No. 4,791,415 to Takahashi; U.S. Pat. No. 4,871,231 to Garcia, Jr.; U.S. Pat. No. 5,184,114 to Brown; U.S. Pat. No. 5,192,946 to Thompson et al.; and U.S. Pat. No. 5,317,348 to Knize).

Several patents have been proposed for displays using two-frequency up-conversion fluorescence (see for example, U.S. Pat. Nos. 5,684,621; 5,764,403; 5,914,807; 5,943,160; and 5,956,172 all to Downing). The Downing '403 patent appears to be the most relevant to the subject invention. Downing '403 is primarily concerned with embodiments where the use of different layers for red, green and blue emitters, abstract, FIG. 6, and briefly describes some mixing of only crystal type materials in a single display media. However, for the single display media, Downing '403 uses nanometer sized particles, column 4, lines 33+, column 9, lines 42–45, which would inherently be difficult to form, handle and disperse in a display medium.

Other relevant known patents such as U.S. Pat. No. 5,003,179 to Pollack; 5,051,278 to Paz-Pujalt; U.S. Pat. No. 5,154,962 to Mertens et al.; U.S. Pat. No. 5,245,623 to McFarlane; U.S. Pat. No. 5,622,807 to Cutler; U.S. Pat. No. 5,846,684 to Paz-Pujalt et al. also fail to overcome the problems with the other patents described above.

The concept of frequency up-conversion (UC) of infrared-to-visible light in rare-earth (RE) doped materials was reported more than forty years ago for the first time. The efficiency that was observed or expected for this process was low in singly doped media, but it was quickly noticed that the mechanism could be made one or two orders of magnitude more efficient by using ytterbium (Yb) as a sensitizer ion in addition to the active ion: erbium (Er), holmium (Ho), or thulium (Tm). Efficient UC materials were extensively investigated, as they could be used for several potentially useful photonic applications, such as in UC lasers (visible lasers that are pumped by infrared diode lasers), or in display applications. However, because no powerful source existed in the 980-nm region in order to excite those up-converters, no practical product came out of the research. With the development of powerful 980-nm diode lasers lead by the telecommunication industry, a technology that appeared to be too inefficient in the past now has legitimate practical applications.

It has been noticed in the past that pumping conditions caused heating of the material and that higher efficiencies were obtained with low duty cycle excitation. It was also reported that for a same average input power, higher efficiencies were expected in pulsed excitation mode than in continuous wave (cw) excitation due to the quadratic nature of the process. The effect of the pumping conditions for display applications of UC materials need to be understood, as several technologies might be used to form the image. The infrared source can either be scanned (vector-addressed or raster-scan), or the image can be directly projected using Digital Micromirror Devices (MEMS) such as in the Texas Instrument Digital Light Processing (DLP™) technology. In the latter case the materials would be undergoing pulse-excitation, whereas they would be quasi-continuously excited in the second case.

As earlier noted. the development of powerful diode lasers emitting near 980-nm by the telecommunication industry is an enabling technology that allows up conversion to be used in displays. In the past no good pump source was available. Now these diodes provide for practical applications when the efficiency of up-conversion materials are enhanced to provide useful levels of fluorescence.

SUMMARY OF THE INVENTION

A primary objective of this invention is to provide an inexpensive display medium for two and possibly three dimensional displays.

A secondary objective of this invention is to provide a transparent polymer (plastic) containing particles doped with rare earth ions for use as display medium for two and three dimensional displays.

A third objective of this invention is to provide homogeneously dispersed rare earth doped crystalline particles in a polymer and illuminated with light with wavelength near 980 nm so illuminated and provided with thermal management to result in enhanced luminescence efficiency.

A fourth objective of this invention is to provide a display medium for the up-conversion of 980-nm light to the visible for two and three dimensional displays.

The invention can be used with up-conversion displays with specific applications for two and three dimensional displays such as those described in parent patent application Ser. No. 09/448,657 filed Nov. 24, 1999, now U.S. Pat. No. 6,327,074, by the same assignee as the subject invention and of which is incorporated by reference thereto.

Novel display media according to this invention includes a method for using an up-conversion phosphor as the emitting material in a reflective display comprising the step of designing the shape of said display to maximally remove any heat developed in the emitting material whereby the emittance level of said phosphor is markedly increased.

DETAILED DESCRIPTION OF THE INVENTION

Figure 1:
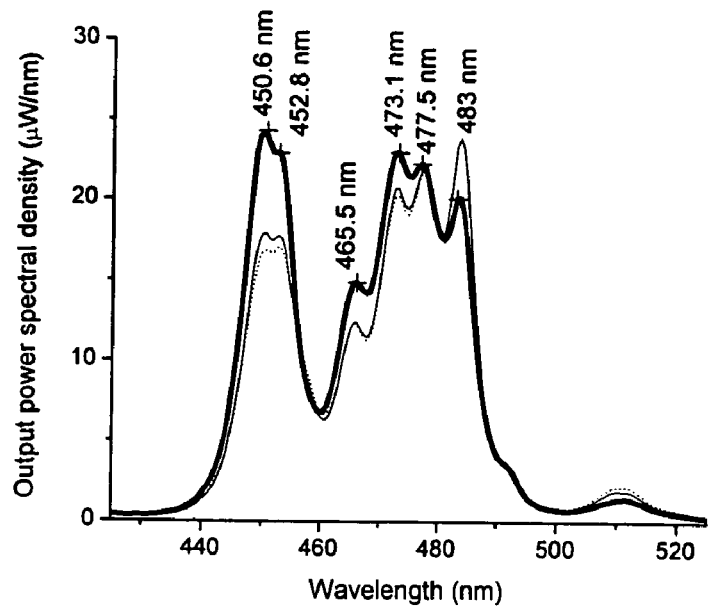
FIG. 1 shows emission spectra of approximately 0.4% Tm, approximately 25% Yb:YLF with the sample holder made of acrylic resin.

Before explaining the disclosed embodiment of the present invention in detail it is to be understood that the invention is not limited in its application to the details of the particular arrangements shown since the invention is capable of other embodiments. Also, the terminology used herein is for the purpose of description and not of limitation.

It has been found in accordance with this invention that pumping with pulses as either by the irradiation or scanning process in a display, and providing proper means for thermal management of the emitting materials, both contribute to making efficient up-conversion displays with diode laser pumping attractive for display applications. This disclosure explains the techniques to achieve the desired higher efficiency.

As previously described, the subject invention can be used with up conversion displays with specific applications for two and three dimensional displays such as those described in parent patent applications U.S. application Ser. Nos. 09/919,130 and 09/919,131 both filed Jul. 31, 2001, now U.S. Pat. Nos. 6,844,387 and 6,654,161, respectively, and Ser. No. 09/448,657 filed Nov. 24, 1999, now U.S. Pat. No. 6,327,074, all to the same assignee as that of the subject invention and all of which are incorporated herein by reference thereto.

Table 1 is a list of various crystals and co-dopants and central wavelengths of the bands of visible emission detected following excitation with a diode laser source operating at approximately 968 nm.

TABLE 1

| Doping ion | | Peak emission wavelength (nm) | | |
|---|---|---|---|---|
| $Yb^{3+}$ + | Crystal host | blue | green | Red |
| $Tm^{3+}$ | $NaYF_4$ | 450, 475 | | 647, 698 |
| | KYF | 481 | | 652 |
| | YLF | 483 | | 648 |
| | $LuPO_4$ | 475 | | 649, 704 |
| $Er^{3+}$ | $NaYF_4$ | 411 | 540 | 660 |
| | KYF | | 550 | 654, 670 |
| | YLF | | 541, 549 | 654, 668 |
| | $LuPO_4$ | | 526, 550 | 657, 667 |
| $Ho^{3+}$ | $NaYF_4$ | | 540 | 648 |
| | KYF | | 544 | 658 |

Table 1: Visible emission of Tm, Er and Ho after Yb excitation in different hosts In Table 1, $Yb^{3+}$ refers to ytterbium, $Tm^{3+}$ refers to thulium, $Er^{3+}$ refers to erbium, $Ho^{3+}$ refers to holmium, $NaYF_4$ refers to crystal sodium yttrium fluoride, and the superscript 3+ refers to the triply ionized state of the atom. Referring again to Table 1, KYF is short for $KYF_4$ and refers to crystal, potassium yttrium fluoride. YLF is short for $YLiF_4$ and refers to the crystal, yttrium lithium fluoride. $LuPO_4$ refers to the crystal, lutetium orthophosphate.

The crystals and dopants listed in Table 1 are illustrative of a few of the combinations that can be used. Other lanthanide (rare earth) atoms in the 3+state can also be used as dopants. For example, $Nd^{3+}$, $Pr^{3+}$, $Ce^{3+}$ and the like, can also be used. There can be other oxide and flouride crystals that can serve as host crystals. Transition metal dopants such as but not limited to $Cr^{3+}$, $Ti^{3+}$ and the like, can serve as dopants in these host crystals as well. Additionally, other crystals and activators that can be used for this invention can include those listed from pages 171 to page 311 listed in Laser Crystals by Alexander Kaminski, (Springer Verlag, New York) SBN 0-387-09576-4, 1981. These crystals and their activators can include but are not limited to the following described activators and crystal combinations.

Activator $Pr^{3+}$ and crystals can include: $LiYF_4$, $Ca(NbO_3)_2$, $CaWO_4$, and $SrMoO_4$.

Activator $Nd^{3+}$ and crystals can include: $LiYF_4$, $LiYO_2$, $LiNbO_3$, $LiNbP_4O_{12}$, $CaF_2$, $SrF_2$, $BaF_2$, $LaF_3$, $CeF_3$, $NaF$, $NaCaYF_6$, $NaCaCeF_6$, $NaNdP_4O_{12}$, $YF_3$, $CaYF$, $SrYF$, $CeO_2$, $GdF_3$, $YF_3$, $LuF_3$, $CdF_2$, $KY(MoO_4)_2$, $KY(WO_4)_2$, $KNdP_4O_{12}$, $KGd(WO_4)_2$, $CaMg_2Y_2$, $CaAl_4O_7$, $CaAl_{12}O_{19}$, Activator $Nd^{3+}$ and crystals can include: $LiYF_4$, $LiYO_2$, $LiNbO_3$, $LiNbP_4O_{12}$, $CaF_2$, $SrF_2$, $BaF_2$, $LaF_3$, $CeF_3$, $NaF$, $NaCaYF_6$, $NaCaCeF_6$, $NaNdP_4O_{12}$, $YF_3$, $CaYF$, $SrYF$, $CeO_2$, $GdF_3$, $YF_3$, $LuF_3$, $CdF_2$, $KY(MoO_4)_2$, $KY(WO_4)_2$, $KNdP_4O_{12}$, $KGd(WO_4)_2$, $CaMg_2Y_2$, $CaAl_4O_7$, $CaAl_{12}O_{19}$, $CaSc_2O_4$, $Ca_3(VO_4)_2$, $Ca(NbO_3)_2$, $CaMoO_4$, $CaWO_4$, $SrA_{12}O_7$, $SrAl_{12}O_{19}$, $SrMoO_4$, $SrWO_4$, $Y_2O_3$, $YAlO_3$, $Y_3Al_5O_{12}$, $Y_2SiO_5$, $YP_5O_{14}$, $Y_3Sc_2Al_3O_{12}$, $Y_3Sc_2Ga_3O_{12}$, $YVO_4$, $Y_3Ga_5O_{12}$, $(Y, Lu)_3Al_5O_{12}$, $Ba_{0.25}Mg_{2.75}Y_2$, $LaBe_2O_5$, $La_2O_3$, $LaAlO_3$, $LaP_5O_{14}$, $LaNbO_4$, $CeP_5O_{14}$, $NdAl_3(BO_3)_4$, $NdP_5O_{14}$, $Gd_2O_3$, $GdAlO_3$, $GdP_5O_{14}$, $GdScO_3$, $Gd_3Sc_2Al_3O_{12}$, $Gd_3Sc_2Ga_3O_{12}$, $Gd_3Ga_5O_{12}$, $Gd_2(MoO_4)_3$, $LuAlO_3$, $Lu_3Ga_5O_{12}$, $PbMoO_4$, $Bi_4Si_3O_{12}$, $Bi_4Ge_3O_{12}$, $LiLa(MoO_4)_2$, $Li(Nd, La)P_4O_{12}$, $Li(Nd, Gd)P_4O_{12}$, $LiGd(MoO_4)_2$, $NaLa(MoO_4)_2$, $NaLa(WO_4)_2$, $Na_3Nd(PO_4)_2$, $Na_5Nd(WO_4)_2$, $Na_3Gd(WO_4)_2$, $Na(Nd, Gd)$, $Ka(MoO_4)_2$, $K_3Nd(PO_4)_2$, $K_3(Nd, La)$, $K_3Nd(MoO_4)_4$, $K_5Bi(MoO_4)_4$, $CaY_4(SiO_4)_3O$, $Ca_{0.25}Ba_{0.75}$, $CaLa_4(SiO_4)_3O$, $CaLa(PO_4)_3O$, $CaGd_4(SiO_4)_3O$, $YScO_3$, $Y_2Ti_2O_7$, $ZrO_2$—$Y_2O_3$, $Ba_2MgGe_2O_7$, $Ba_2ZnGe_2O_7$, $(Nd, Sc)P_5O_{14}$, $(Nd, In)P_5O_{14}$, $(Nd, La)P_5O_{14}$, $(Nd, Gd)Al_3$, $LuScO_3$, $HfO_2$—$Y_2O_3$, $Bi_4(Si, Ge)_3O_{12}$, $Ca_5(PO_4)_3F$, $Sr_5(PO_4)_3F$, and $La_2O_2S$, $CeCl_3$, $Pb_5(PO_4)_3F$.

Activator $Ho^{3+}$ and crystals can include: $LiYF_4$, $Li(Y, Er)F_4$, $LiNbO_3$, $CaF_2$, $LiHoF_4$, $BaY_2F_8$, $Ba(Y, Er)_2F_8$, $HoF_3$, $CaF_2$, $YF_3$, $ErF_3$, $NaCaErF_6$, $K(Y, Er)(WO_4)_2$, $KGd(WO_4)_2$, $Ca(NbO_3)_2$, $CaMoO_4$, $CaWO_4$, $YAlO_3$, $Y_3Al_5O_{12}$, $Y_2SiO_5$, $YVO_4$, $Y_3Fe_5O_{12}$, $Y_3Ga_5O_{12}$, $(Y, Er)Al_3$, $(Y, Er)_3Al_5O_{12}$, $LaNbO_4$, $GdAlO_3$, $Ho_3Al_5O_{12}$, $Ho_3Sc_2Al_3O_{12}$, $Ho_3Ga_5O_{12}$, $Er_2O_3$, $ErAlO_3$, $Er_2SiO_5$, $Er_3Sc_2Al_3O_{12}$, $ErVO_4$, $(Er, Tm, Yb)_3$, $(Er, Lu)AlO_3$, $Yb_3Al_5O_{12}$, $LuAlO_3$, $Lu_3Al_5O_{12}$, $NaLa(MoO_4)_2$, $CaY_4(SiO_4)_3O$, $SrY_4(SiO_4)_3O$, $SrLa_4(SiO_4)_3O$, $ZrO_2$—$Er_2O_3$, $Ba_2NaNb_5O_{15}$, and $Ca_5(PO_4)_3F$.

Activator $Er^{3+}$ and crystals can include: $LiYF_4$, $LiErF_4$, $CaF_2$, $BaY_2F_8$, $Ba(Y, Er)_2F_8$, $LaF_3$, $YF_3$, $ErF_3$, $K(Y, Er)(WO_4)_2$, $KGd(WO_4)_2$, $CaAl_4O_7$, $Ca(NbO_3)_2$, $CaWO_4$, $YAlO_3$, $Y_3Al_5O_{12}$, $(Y, Er)_3Al_5O_{12}$, $GdAlO_3$, $Er_3Al_5O_{12}$, $(Er, Lu)_3Al_5O_{12}$, $Yb_3Al_5O_{12}$, $LuAlO_3$, and $Lu_3Al_5O_{12}$.

Activator $Ni^{2+}$ and crystals can include: $MgF_2$, $MnF_2$, and MgO. Activator $V^{2+}$ and crystals can include: $MgF_2$. Activator $Co^{2+}$ and crystals can include: $MgF_2$, $KMgF_2$, and $ZnF_2$. Activator $Yb^{3+}$ and crystals can include: $CaF_2$,:$Nd^{3+}$, $Y_3Al_5O_{12}$, $Y_3Ga_5O_{12}$, (Y, Yb)$_3Al_5O_{12}$, $Gd_3Sc_2Al_3O_{12}$, $Gd_3Ga_5O_{12}$, (Yb, Lu)$_3Al_5O_{12}$, $Lu_3Al_5O_{12}$, $Lu_3Sc_2Al_3O_{12}$, and $Lu_3Ga_5O_{12}$. Activator $Sm^{2+}$ and crystals can include: $CaF_2$, $SrF_2$. Activator $Dy^{2+}$ and crystals can include: $CaF_2$, $SrF_2$. Activator $Dy^{3+}$ and crystals can include: $Ba(Y,Er)_2F_8$. Activator $Tm^{2+}$ and crystals can include: $CaF_2$.

Activator $Tm^{3+}$ and crystals can include: $CaF_2$, $SrF_2$, $ErF_3$, $NaCaErF_6$, $LiNbO_3$, $Ca(NbO_3)_2$, $CaMoO_4$, $CaWO_4$, $YAlO_3$, $Y_3Al_5O_{12}$, $YVO_4$, (Y, Er)Al$_3$, (Y, Er)$_3Al_5O_{12}$, $GdAlO_3$, $Er_2O_3$, $ErAlO_3$, $Er_3Al_5O_{12}$, (Er, Yb)$_3Al_5O_{12}$, (Er, Lu)AlO$_3$, $Lu_3Al_5O_{12}$, and $ZrO_2$—$Er_2O_3$.

Activator $U^{3+}$ and crystals can include: $CaF_2$, $SrF_2$, and $BaF_2$. Activator $Pr^{3+}$ and crystals can include: $LaF_3$, $LaCl_3$, $LaBr_3$, $PrCl_3$, and $PrBr_3$. Activator $Cr^{3+}$ and crystals can include: $BeAl_2O_4$, $Al_2O_3$, and $Y_3Al_5O_{12}$. Activator $Eu^{3+}$ and crystals can include: $Y_2O_3$, $YVO_4$. Activator $Gd^{3+}$ and crystals can include: $Y_3Al_5O_{12}$.

Some of the dopant-host combinations can also emit useful infrared light through excitation by absorption of a single photon. This invention can also include systems that emit infrared light by this process of down-conversion(e.g. absorbing a high energy photon and emitting one of lower energy) as well as systems that are excited by such two photon processes as up-conversion(e.g. absorbing more than one low energy photons and emitting one or more higher energy photons).

The rare earth doped crystalline particles are dispersed in a passive polymer host that can be comprised of a copolymer of alkyl acrylate or alkyl methacrylate and a dialkyl vinylbenzylphosphonate, alkyl vinylbenzylphosphonic acid monoester, or vinylbenzylphosphonic acid. The ratios of the acrylate or methacrylate to the phosphonate can range from approximately 95:5 molar ratio to approximately 20:80 molar ratio, respectively. Luminescent heavy metal ions such as rare earth compounds (for example, $NaYF_4$:ErYb) loading in the host polymer matrix can range from approximately 5 up to approximately 80 weight percent. Stabilization of the dispersed heavy element luminophores can be accomplished through complexation with the phosphoryl moieties.

One can prepare the crystals as approximately 10 μm size particles and disperse them in a phosphorylated polymethylmethacrylate (p-PMMA) host. This results in a display medium that can be formed to any desired shape, e.g., as a pixel, can be transparent or not, as desired, and can be affixed to any desired substrate; preferably a heat conductive substrate capable of maximally heat removal.

In this disclosure of the invention, the role of temperature on the efficiency of our up-conversion materials is set forth as well as the effect of various substrate materials, pumping rates and duration on the performance of three of our best performing up-conversion (UC) materials. The materials used for the up-conversion material are characterized by color: green (Yb, Er doped sodium yttrium fluoride or Yb,Er:NYF$_4$): red (Yb, Br doped yttrium fluoride or Yb,Er:YF$_3$); and, blue (Yb, Tm doped yttrium lithium fluoride or Yb,Tm:YLF$_4$).

The results of the investigation are hereafter set forth.

The performance of the blue up-conversion material was altered when pumping with a continuous source compared to when using short pulse excitation. An early analysis that solved the rate equations numerically illustrated that this behavior could be explained when temperature-dependent transfer and cross-relaxation rates were included. In order to better understand thermal effects, the emission spectra obtained for the three color up-conversion materials when pumped with various intensities and pulse durations was recorded. Reference should now be made to FIG. 1 where a typical result for the blue emitter is shown. Emission spectra of approximately 0.4% Tm, approximately 25% Yb:YLF$_4$. The sample holder was made in acrylic. Three conditions of excitation were used: bold line corresponds to continuous pumping, the thin line represents approximately 5 ms pulse at a repetition rate of approximately 30 Hz, and the dotted line represents approximately 2 ms pulse at a repetition rate of approximately 30 Hz. The output luminance in the blue was the same in the three excitation conditions(approximately 58 mLm). The output power was the same in the three excitation conditions.

The peaks at approximately 463 nm and approximately 481 nm originate from the same upper energy level but different Stark splittings sub-levels. Those sub-levels are thermalized and the spectral distribution is therefore a signature of the temperature inside the sample. It can be shown from FIG. 1 that the temperature of the sample is much higher when continuous pumping is used than when pulsed excitation is used.

By using a hot plate and a thermocouple, the emission spectra after excitation with a low energy pulse the emission spectra can be recorded (no heating due to the excitation) at different pre-determined temperatures. From those measurements, one can determine the temperature in the sample at different output powers for various pump durations.

Figure 2:
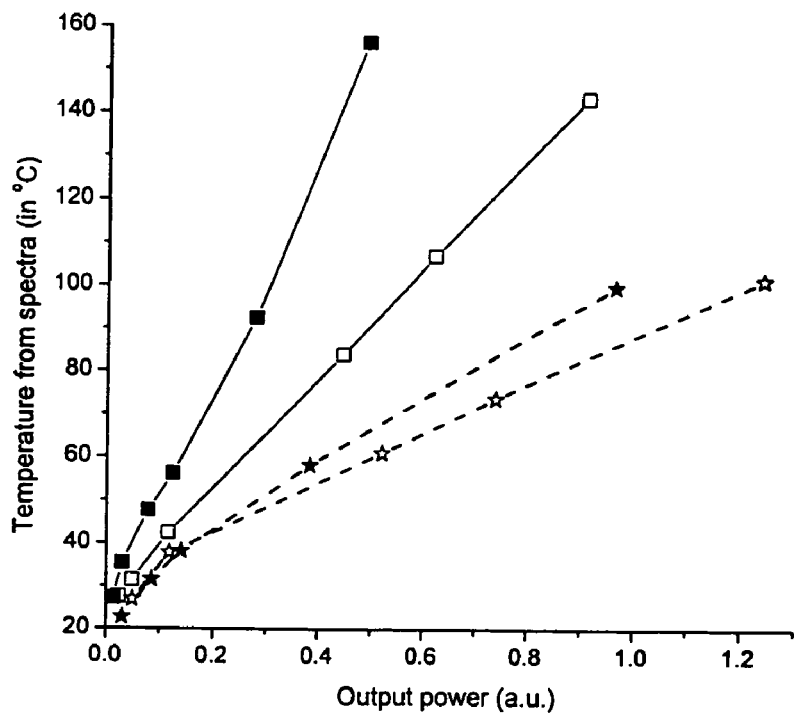
FIG. 2 shows the temperature of the emitting powder for various output powers in a sample of approximately 0.4% Tm, 25% Yb:YLF.

Reference should now be made to FIG. 2 which shows the resulting temperatures for two types of powder holders: acrylic and copper. The temperatures of the emitting powder for various output power in a sample of approximately 0.4% Tm, approximately 25% Yb:YLF$_4$ was recorded to establish if the nature of the holders was significant. Two sample holders were used: acrylic(solid lines) and copper(dashed lines). The solid symbols correspond to cw(continuous wave) excitation, the hollow symbols are for an approximately 30 Hz, approximately 5 ms pulse. The powder was contained in a cylinder hole of approximately 750 micron diameter, approximately 500 micron deep. There are two conclusions that can be drawn from that plot: first, for a given output power (or brightness), the temperature reached when pumping continuously is higher than when a short excitation pulse is used. Second, using a substrate that extracts the heat produced (high heat diffusion coefficient) significantly reduces the heating of the powder.

Figure 3:
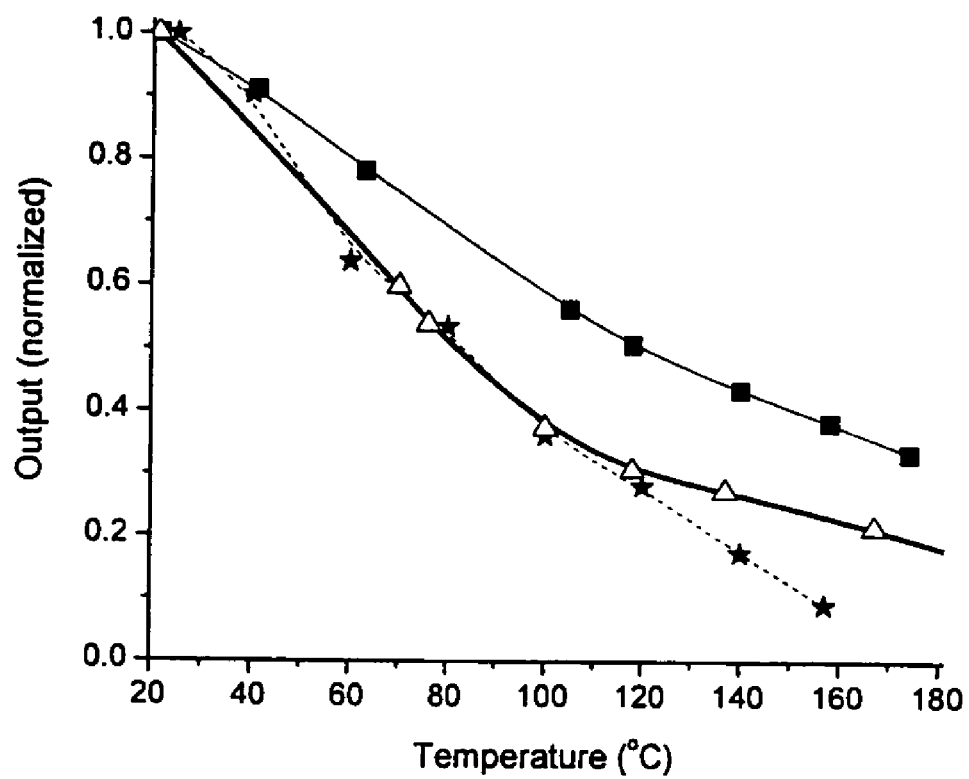
FIG. 3 shows the normalized output power from the red, green and blue up-conversion materials as a function of temperature.

Finally, the total output power as the temperature of the sample was measured. The results are shown in FIG. 3 for the three red, green and blue (RGB) emitters in which the normalized output power from the red, green and blue up-conversion materials as a function of temperature are plotted. FIG. 3 shows normalized output power at low incident pump intensity from the red(thin line and solid stars), green(thin line and solid squares), and blue(thick line and hollow triangles) up-conversion materials as a function of temperature.

Through the green phosphor is only slightly affected by heating, the blue and the red emitters' performance greatly diminish when operated at the temperature reached when no thermal management is included in the design of a display. Experimental results show that lowering the operating temperature is the key to optimizing up-conversion materials performance. As shown by the graph of FIG. 3, the three color up-conversion material has a maximum normalized output at a temperature of approximately 20 C when the same pulse excitation is applied to the three color up-conversion material. Preliminary simulations using Femlab™ show that using a material with high heat-diffusion-coefficient such as metals (copper) for reflective displays or chemical vapor deposition (CVD) diamond for both reflective and transmissive displays, as a substrate, reducing the pixel size to less than approximately 250 microns, and using pixels in the form of inverted cones to hold the up converting medium, will enable the use of up-conversion materials at temperatures within approximately 20° C. of room-temperature which can be considered approximately room temperature.

Photonic displays based on up-conversion materials have numerous advantages that make the technology appealing: the phosphors emit very narrow lines (~40 nm wide) which produce a very wide color gamut (That is, they define area of the color response diagram much greater than that of conventional cathode ray tube phosphors) and saturated colors, high-brightness (several $kCd/m^2$) can be achieved without damage to the phosphors, and no vacuum nor high-voltage is required. However, improving the materials' efficiency is paramount to making this technology able to compete with existing display technologies. In this work, one important step was identified in order to optimize the performance of the up-conversion phosphors: using heat-conductive substrate such as copper or aluminum or CVD diamond will reduce the operating temperature of the powder and improve the efficiency (efficiency is the ratio of the light power output of the display to the total power input to the display) of the display.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for using an up-conversion phosphor as an emitting material in a reflective display comprising the step of:
   designing a shape of said display to hold said up-conversion phosphor;
   pumping said display from a source with an intensity and a duration to excite said up-conversion phosphor;
   selecting said display to maximally remove any heat developed in the up-conversion phosphor in the emitting material during said pumping to optimize a performance of said up-conversion phosphor, wherein the luminescent efficiency of said up-conversion phosphor is substantially increased.

2. The method according to claim 1 wherein said reflective display is a pixel.

3. The method according to claim 1 wherein said reflective display is a substrate.

4. The method according to claim 3 wherein said reflective display is heat conductive.

5. The method according to claim 3 wherein said reflective display is copper.

6. The method according to claim 3 wherein said reflective display is aluminum.

7. The method according to claim 3 wherein said reflective display is chemical vapor deposition (CVD) diamond.

8. A method for using an up-conversion phosphor as an emitting material in a transmissive display comprising the step of:
   designing a shape and material of said display to maximally remove any heat developed in the emitting material when pumped with an intensity and a duration, wherein the luminescent efficiency of said up-conversion phosphor is substantially increased.

9. The method according to claim 8 wherein said transmissive display is a pixel.

10. The method according to claim 8 wherein said transmissive display is a substrate.

11. The method according to claim 8 wherein said transmissive display is heat conductive.

12. The method according to claim 8 wherein said transmissive display is copper.

13. The method according to claim 8 wherein said transmissive display is aluminum.

14. The method according to claim 8 wherein said transmissive display is chemical vapor deposition (CVD) diamond.

15. A blue green red (BRG) display medium comprising:
   (a) pixels having a blue, a green and a red emitter dispersed on a high heat conductive substrate; and,
   (b) means for pulsing said pixels with a beam of light with wavelength near approximately 980 μm, wherein said high heat conductive substrate provides thermal management to optimize performance of said pixels to emit appropriate blue, green and red luminescence when pumped with the 980 μm wavelength beam of light.

16. The blue green red (BRG) display medium according to claim 15 wherein said means is by short pulse excitation.

17. An up conversion display comprising:
   a three color up-conversion material having three different emitters;
   a heat-conductive substrate to reduce the operating temperature of the three color up-conversion material, wherein the substrate has a shape to hold the three color up-conversion material; and
   a pumping source for providing a pulse having an intensity and a duration for exciting the three color up-conversion material, wherein the three color up-conversion material and the pulse intensity and pulse duration are selected to optimize the up-conversion process to emit the three colors and improve the efficiency of the display.

* * * * *